United States Patent
Lee et al.

(10) Patent No.: US 6,882,614 B2
(45) Date of Patent: Apr. 19, 2005

(54) RECORDING/REPRODUCING APPARATUS HAVING AN OPTICAL PICKUP DEVICE TO READ FROM AND RECORD INFORMATION TO DISKS OF DIFFERENT THICKNESSES

(75) Inventors: Chul-woo Lee, Seoul (KR); Jang-hoon Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/789,522

(22) Filed: Feb. 22, 2001

(65) Prior Publication Data

US 2001/0005352 A1 Jun. 28, 2001

Related U.S. Application Data

(63) Continuation of application No. 09/467,385, filed on Dec. 21, 1999, now Pat. No. 6,259,668, which is a continuation-in-part of application No. 09/291,031, filed on Apr. 14, 1999, now Pat. No. 6,147,955, which is a continuation of application No. 08/933,249, filed on Sep. 18, 1997, now Pat. No. 5,909,424, which is a continuation of application No. 08/779,521, filed on Jan. 7, 1997, now abandoned.

(30) Foreign Application Priority Data

Feb. 14, 1996 (KR) .............................. 96-3603

(51) Int. Cl.⁷ ................................. G11B 7/09
(52) U.S. Cl. ................. 369/112.26; 369/44.23; 369/44.12; 369/112.23; 369/112.13; 369/112.08
(58) Field of Search ................. 369/112.26, 44.23, 369/53.2, 44.12, 112.23, 112.13, 112.08, 112.07, 44.14, 112.06, 53.22, 112.05, 94, 112.12, 121, 53.23, 112.01, 112.1, 13.29, 112.18, 112.2, 112.24; 359/487, 569, 494, 719, 675, 495, 708, 565, 19, 16, 566, 570; 351/161

(56) References Cited

U.S. PATENT DOCUMENTS 2,233,591 A 3/1941 Dulovits ..................... 359/707
3,305,294 A 2/1967 Alverez ...................... 359/708

(Continued)

FOREIGN PATENT DOCUMENTS

DE 7263552 10/1942
EP 0 838 812 4/1998

(Continued)

OTHER PUBLICATIONS

Japanese Office Action for Japanese application No. 2002-163543.

Primary Examiner—Tan Dinh
Assistant Examiner—Kim-Kwok Chu
(74) Attorney, Agent, or Firm—Stein, McEwen & Bui LLP

(57) ABSTRACT

A recording/reproducing apparatus having an optical pickup device which is efficient in light use having little spherical aberration. The recording and/or reproducing apparatus includes an optical pickup having an objective lens, disposed opposite a disk, having a light passing region divided into central, intermediate and periphery regions corresponding to a near axis area, an intermediate axis area and a far axis area of incident light, where the curvature of the central and peripheral regions is optimized for a thin disk and that of the intermediate region is optimized for a thick disk, a light source irradiating light toward a disk through the objective lens; a photo detector for detecting light reflected from the disk, and a beam splitter, disposed between the objective lens and the light source, for transmitting light from the light source toward the objective lens and for diffracting light reflected from the disks toward the photo detector; and a processing unit to process an information signal to control the incident light generated by the light source, and to process the detected light from the photodetector. Therefore, the optical pickup device can be used for both compact disks (CDs) that are thick using light beam passing the near and intermediate regions of said objective lens, and digital video disks (DVDs) that are thin using light beam passing the near and far axis regions of said objective lens, and detect signals without picking up noise regardless of the thickness of the disk.

21 Claims, 4 Drawing Sheets

U.S. PATENT DOCUMENTS

| | | | |
|---|---|---|---|
| 3,958,884 A | 5/1976 | Smith | 356/495 |
| 4,074,314 A | 2/1978 | Velzel et al. | 369/44.37 |
| 4,210,391 A | 7/1980 | Cohen | 351/161 |
| 4,266,534 A | 5/1981 | Ogawa | 600/177 |
| 4,501,493 A | 2/1985 | Kubota | 369/44.23 |
| 4,545,653 A | 10/1985 | Brenden et al. | 359/719 |
| 4,566,762 A | 1/1986 | Kato | 359/487 |
| 4,612,437 A | 9/1986 | Ohsato | 250/201.5 |
| 4,631,397 A | 12/1986 | Ohsato et al. | 250/201.4 |
| 4,733,943 A | 3/1988 | Suzuki et al. | 359/565 |
| 4,741,605 A | 5/1988 | Alfredsson et al. | 359/675 |
| 4,904,856 A | 2/1990 | Nagahama et al. | 369/44.23 |
| 4,918,679 A | 4/1990 | Opheij et al. | 369/44.23 |
| 4,938,573 A | 7/1990 | Saito | 359/719 |
| 4,995,714 A | 2/1991 | Cohen | 351/161 |
| 4,995,715 A | 2/1991 | Cohen | 351/161 |
| 5,120,120 A | 6/1992 | Cohen | 351/161 |
| 5,132,843 A | 7/1992 | Aoyama et al. | 359/573 |
| 5,142,411 A | 8/1992 | Fiala | 359/494 |
| 5,153,778 A | 10/1992 | Sasian-Alvarado | 359/742 |
| 5,161,040 A * | 11/1992 | Yokoyama et al. | 369/44.12 |
| 5,161,148 A | 11/1992 | Hori et al. | 369/112.25 |
| 5,164,584 A | 11/1992 | Wike, Jr. et al. | 250/216 |
| 5,195,072 A | 3/1993 | Fukui et al. | 369/44.23 |
| 5,235,581 A | 8/1993 | Miyagawa et al. | 369/44.12 |
| 5,303,221 A | 4/1994 | Maeda et al. | 369/112.1 |
| 5,349,471 A | 9/1994 | Morris et al. | 359/565 |
| 5,438,187 A | 8/1995 | Reddersen et al. | 235/462.22 |
| 5,446,565 A | 8/1995 | Komma et al. | 369/44.23 |
| 5,473,471 A | 12/1995 | Yamagata et al. | 359/569 |
| 5,526,338 A | 6/1996 | Hasman et al. | 369/94 |
| 5,583,843 A | 12/1996 | Horinouchi | 369/112.1 |
| 5,587,981 A | 12/1996 | Kamatani | 369/47.54 |
| 5,612,942 A | 3/1997 | Takahashi | 369/112.18 |
| 5,615,199 A | 3/1997 | Tatsuno et al. | 369/112.2 |
| 5,659,533 A | 8/1997 | Chen et al. | 369/112.01 |
| 5,665,957 A | 9/1997 | Lee et al. | 369/53.23 |
| 5,696,750 A | 12/1997 | Katayama | 369/112.06 |
| 5,703,856 A | 12/1997 | Hayashi et al. | 369/53.2 |
| 5,703,862 A | 12/1997 | Lee et al. | 369/112.26 |
| 5,708,638 A | 1/1998 | Braat et al. | 369/44.29 |
| 5,708,641 A | 1/1998 | Choi et al. | 369/112.07 |
| 5,708,643 A | 1/1998 | Choi et al. | 369/112.26 |
| 5,724,335 A | 3/1998 | Kobayashi | 369/112.08 |
| 5,729,510 A | 3/1998 | Kasahara et al. | 369/44.14 |
| 5,734,512 A | 3/1998 | Shin et al. | 359/721 |
| 5,737,300 A | 4/1998 | Ota et al. | 369/112.24 |
| 5,745,304 A | 4/1998 | Choi | 369/44.23 |
| 5,754,512 A | 5/1998 | Komma et al. | 369/112.08 |
| 5,768,031 A * | 6/1998 | Yang | 359/708 |
| 5,777,803 A * | 7/1998 | Ju et al. | 359/719 |
| 5,777,973 A | 7/1998 | Yoo et al. | 369/112.06 |
| 5,787,062 A | 7/1998 | Mochizuki | 369/53.22 |
| 5,790,503 A | 8/1998 | Mizuno et al. | 369/112.19 |
| 5,796,683 A | 8/1998 | Sumi et al. | 369/13.29 |
| 5,802,037 A | 9/1998 | Lee et al. | |
| 5,809,000 A | 9/1998 | Choi | 369/112.05 |
| 5,815,293 A | 9/1998 | Komma et al. | 359/19 |
| 5,831,953 A | 11/1998 | Numata | 369/53.23 |
| 5,835,283 A | 11/1998 | Yamanaka | |
| 5,844,879 A | 12/1998 | Morita et al. | 369/118 |
| 5,856,965 A | 1/1999 | Tsuchiya et al. | 369/44.37 |
| 5,867,468 A | 2/1999 | Mori et al. | 369/112.12 |
| 5,870,369 A | 2/1999 | Chung et al. | 369/112.26 |
| 5,870,371 A | 2/1999 | Tsuchiya et al. | 369/94 |
| 5,883,874 A | 3/1999 | Choi | 369/112.26 |
| 5,889,748 A | 3/1999 | Shimano et al. | |
| 5,903,536 A | 5/1999 | Lee et al. | 369/44.12 |
| 5,907,530 A | 5/1999 | Cho et al. | 369/120 |
| 5,909,424 A | 6/1999 | Lee et al. | 369/112.26 |
| 5,917,800 A | 6/1999 | Choi | 369/112.15 |
| 5,930,214 A * | 7/1999 | Kasahara et al. | 369/53.2 |
| 5,933,402 A | 8/1999 | Lee et al. | 369/121 |
| 5,966,357 A | 10/1999 | Ryoo | 369/53.23 |
| 5,986,779 A * | 11/1999 | Tanaka et al. | 359/19 |
| 6,052,237 A | 4/2000 | Opheij et al. | 359/719 |
| 6,061,324 A | 5/2000 | Arai et al. | 369/112.26 |
| 6,091,691 A | 7/2000 | Yoo et al. | |

FOREIGN PATENT DOCUMENTS

| | | |
|---|---|---|
| EP | 0 921 521 A2 | 6/1999 |
| GB | 508448 | 6/1939 |
| GB | 2 315 911 | 2/1998 |
| JP | 62-73429 | 1/1987 |
| JP | 2-118508 | 5/1990 |
| JP | 3-244450 | 10/1991 |
| JP | 5-242520 | 9/1993 |
| JP | 6-215406 | 8/1994 |
| JP | 7-65407 | 3/1995 |
| JP | 07-098431 | 4/1995 |
| JP | 7-302437 | 11/1995 |
| JP | 08-203115 | 8/1996 |
| JP | 09-120557 | 5/1997 |
| JP | 9-145994 | 6/1997 |
| JP | 9-145995 | 6/1997 |
| JP | 09-184975 | 7/1997 |
| JP | 09-198699 | 7/1997 |
| JP | 09-219035 | 8/1997 |
| JP | 9-274135 | 10/1997 |
| JP | 10-228659 | 8/1998 |
| WO | WO 97/08691 | 3/1997 |

* cited by examiner

——— BEAM TRAJACTORY WHEN REPRODUCING INFORMATION FROM THIN DISK

------ BEAM TRAJACTORY WHEN REPRODUCING INFORMATION FROM THICK DISK

——— BEAM TRAJACTORY WHEN REPRODUCING INFORMATION FROM THIN DISK

------ BEAM TRAJACTORY WHEN REPRODUCING INFORMATION FROM THICK DISK

RECORDING/REPRODUCING APPARATUS HAVING AN OPTICAL PICKUP DEVICE TO READ FROM AND RECORD INFORMATION TO DISKS OF DIFFERENT THICKNESSES

CROSS-REFERENCE TO RELATED APPLICATIONS

This application claims the benefit of Korean Application No. 96-3603, filed Feb. 14, 1996, in the Korean Patent Office, the disclosure of which is incorporated herein by reference.

This is a continuation application of Ser. No. 09/467,385, filed Dec. 21, 1999 now U.S. Pat. No. 6,259,668, issued Jul. 10, 2001, which is a continuation-in-part application of Ser. No. 09/291,031, filed Apr. 14, 1999 now U.S. Pat. No. 6,147,955, issued Nov. 14, 2000, which is a continuation of Ser. No. 08/933,249, filed Sep. 18, 1997 now U.S. Pat. No. 5,909,424, issued Jun. 1, 1999, which is a continuation of U.S. Ser. No. 08/779,521, filed Jan. 7, 1997 now abandoned.

BACKGROUND OF THE INVENTION

1. Field of the Invention

The present invention relates to a recording/reproducing apparatus having an optical pickup device, and more particularly, to a recording/reproducing device having an optical pickup device which enables reading out of information from optical disks having different thicknesses and enables recording information thereon.

In the optical pickup of the recording/reproducing device, an objective lens faces a recording surface of an optical disk for focusing light to record information onto the recording surface of the disk or receiving light reflected from the surface of the disk to read information.

2. Description of the Related Art

Recently, research on an optical drive has been conducted in which the drive can seat disks having different thicknesses by adopting a lens device including both a hologram lens and a refractive lens.

FIGS. 1 and 2 show focusing states of a conventional optical pickup device of light incident by zero order diffracted light and 1st order diffracted light on a thin disk and a thick disk, respectively. A refractive lens 2 and a hologram lens 1 are disposed in sequence along an optical path from each of disks 3a and 3b. The hologram lens 1 has a lattice pattern 11 for diffracting light that passes through the hologram lens 1. Thus, while light 4 emitted from a light source (not shown) passes through the hologram lens 1, light is divided into a diffracted 1st order light 41 and a non-diffracted zero order light 40, respectively. While the diffracted 1st order light 41 and the non diffracted zero order light 40 pass through each of the objective lenses 2, the light 41 and 40 are focused with different intensities, thereby forming a focus on the thin disk 3a and on the thick disk 3b.

The lens device described above can record information on disks having different thicknesses and read out information therefrom using zero order light and 1st order light. However, as the incident light is divided into zero order light and 1st order light, the efficiency of light use is lowered. That is, since the incident light is divided into zero order light and 1st order light by the hologram lens 1, the actual amount of light used for recording information is only 15%. Also, when information is reproduced, information is included in only one of zero order light and 1st order light. Thus, 1st order light or zero order light without information is detected by a photo detector and the detected light may produce noise. The above problem can be overcome by processing the hologram lens of the lens device. However, this requires a high precision process of etching a fine pattern on the hologram, thereby increasing the manufacturing cost.

SUMMARY OF THE INVENTION

It is an object of the present invention to provide an optical pickup device wherein parts thereof can be manufactured and assembled easily at low cost.

It is another object of the present invention to provide a recording and/or reproducing apparatus which has high efficiency of light use and low spherical aberration.

To achieve the above and other objects, there is provided a recording and/or reproducing apparatus comprising an optical pickup device and a processing unit, wherein the optical pickup device comprises a light source; an objective lens facing a disk having a light passing region divided into central, intermediate and periphery regions respectively corresponding to a near axis area, an intermediate axis area and a far axis area of incident light, wherein the curvature of the central and peripheral regions are optimized for a thin disk and that of the intermediate region is optimized for a thick disk; a photo detector for detecting light reflected from the disk; a beam splitter, disposed between the objective lens and the light source, for transmitting/reflecting light from the light source toward the objective lens and for reflecting/transmitting light reflected from the disks toward the photo detector; and the processing unit processes an information signal to control the incident light generated by the light source, and processes the detected light from the photodetector.

BRIEF DESCRIPTION OF THE DRAWINGS

The above and other objects and advantages of the present invention will become more apparent by describing in detail a preferred embodiment thereof with reference to the attached drawings in which:

FIG. 8 is a block diagram of a recording/reproducing apparatus for implementing the present invention.

DETAILED DESCRIPTION OF THE INVENTION

Figure 1:
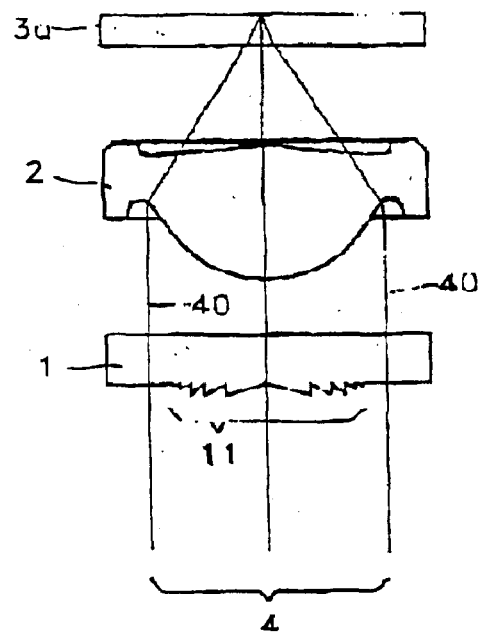
FIG. 1 is a schematic diagram of a conventional lens device having a hologram lens focusing on a thin disk.
Figure 2:
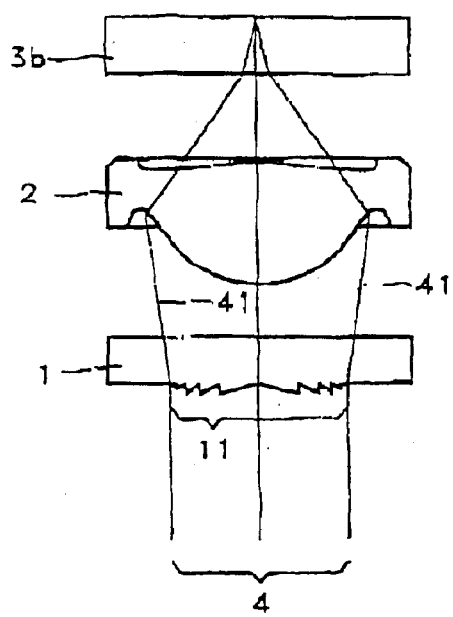
FIG. 2 is a schematic diagram of the lens device of FIG. 1 focusing on a thick disk.

According to an optical pickup device of the present invention, to prevent the generation of spherical aberration from light of an intermediate area when information is reproduced from a thick disk, such that the intermediate area is located between a near axis area and a far axis area relative to a central optical axis, the curvature of an intermediate region corresponding to the intermediate area of the light is optimized with respect to the thick disk. Also, the light receiving area of a photo detector is limited so that light of the far axis area cannot be reached thereto when information is reproduced from the thick disk. Here, the near axis area represents an area around a central axis of the lens with negligible aberration. Also, the far axis area represents an area relatively far from the optical axis compared with that of the near axis area, and the intermediate area represents an area between the near and far axis areas.

FIG. 8 is a block diagram of a recording/reproducing apparatus for implementing the present invention. The function of the recording/reproducing apparatus for recording/reproducing A/V (audio/video) data using a recordable and rewriteable disk is largely divided into recording and reproduction.

During recording, an AV codec 110 compression-codes an externally applied AV signal according to a predetermined compression scheme and supplies size information for the compressed data. A digital signal processor (DSP) 120 receives the compressed A/V data supplied from the AV codec 110, adds additional data for error correction code (ECC) processing thereto, and performs modulation using a predetermined modulation scheme. A radio frequency amplifier (RF AMP) 130 converts the modulated data from the DSP 120 into a radio frequency (RF) signal. Then, a pickup 140 records the RF signal supplied from the RF AMP 130 on a disk mounted on a turn table of the pickup 140. A servo 150 receives information necessary for servo control from a system controller 160 and stably performs a servo function for the mounted disk.

During playback of information data stored on the disk, the pickup 140 picks up the optical signal from the disk having the information data stored therein, and the information data is extracted from the optical signal. The RF AMP 130 converts the optical signal into an RF signal, and extracts the servo signal for performing a servo function, and modulated data. The DSP 120 demodulates the modulated data supplied from the RF AMP 130 corresponding to the modulation scheme used during modulation, performs an ECC process to correct errors, and eliminates added data. The servo unit 150 receives information necessary for servo control from the RF AMP 130 and the system controller 160, and stably performs the servo function. The AV codec 110 decodes the compressed A/V data supplied from the DSP 120 to output an A/V signal. The system controller 160 controls the overall system for reproducing and recording the information data from and on the disk mounted on the turn table of the pickup 140.

Figure 3:
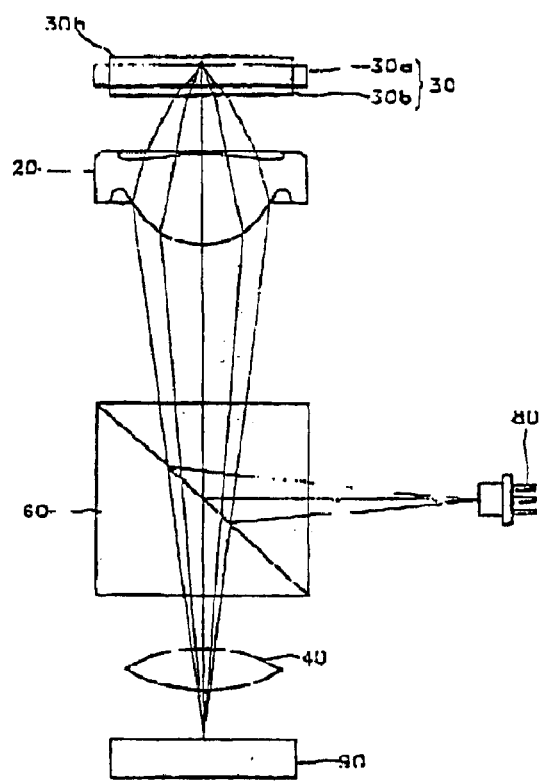
FIG. 3 is a schematic diagram of an optical pickup device according to the present invention.

FIG. 3 is a schematic diagram of an optical pickup device used in the pickup 140 according to the present invention. Like a general optical pickup device, an objective lens 20, a beam splitter (separation unit) 60 and a detecting lens 40 are disposed in sequence on an optical path between a disk 30 and a photo detector 90, and a light source 80 is located on another optical path from the beam splitter 60. The disk 30 may either be a thin (digital video) disk 30a or a thick (compact) disk 30b.

Figure 4:
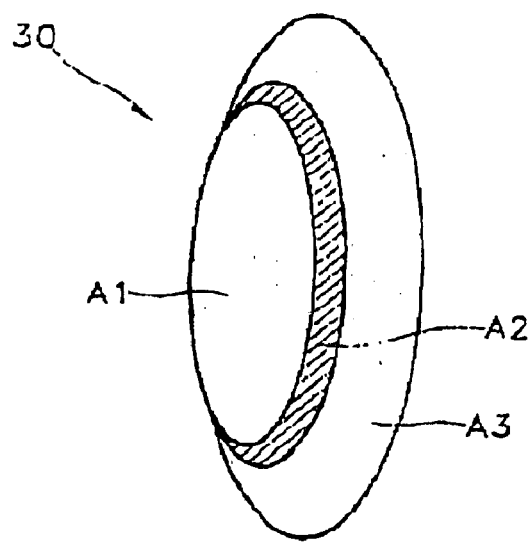
FIGS. 4 and 5 are perspective and front views of an objective lens adopted into the optical pickup device according to the present invention.
Figure 5:
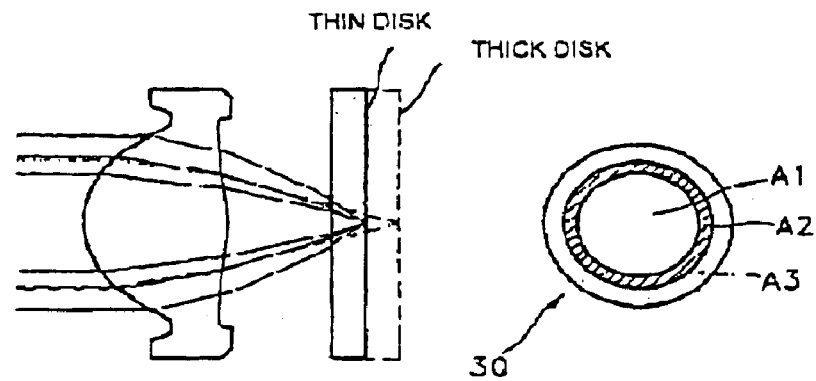

In the optical pickup device having the above structure according to the present invention, FIGS. 4 and 5 show perspective and front views of the objective lens 20, respectively. The reference symbol $WD_D$ denotes the distance between the objective lens and the thin disk 30a, and $WD_c$ denotes the distance between the objective lens and the thick disk 30b. That is, in a reading or writing operation, the working distance for the thin disk 30a is larger than that for the thick disk 30b.

The objective lens 20 has a doughnut- or ring-shaped intermediate region A2 on at least one side, having an outer diameter which is less than the total significant light passing area diameter. Also, a central region A1 and a periphery region A3 are placed inside and outside of the intermediate region A2, respectively. Here, the curvatures of the central and peripheral regions A1 and A3 are optimized for a thin digital video disk (DVD), and that of the intermediate region A2 is optimized for a thick compact disk (CD). Also, depending on circumstances, the intermediate region A2 may be divided into a plurality of subregions. Preferably, the photo detector 90 is designed for only receiving light passed through the central and intermediate regions A1 and A2 of the objective lens 20 when information is reproduced from the thick disk, in which light of the far axis area is not detected by the photo detector 90. The central region A1 is a circular region, the intermediate region A2 is a first disk-shaped region and the periphery region A3 is a second disk-shaped region.

Figure 6:
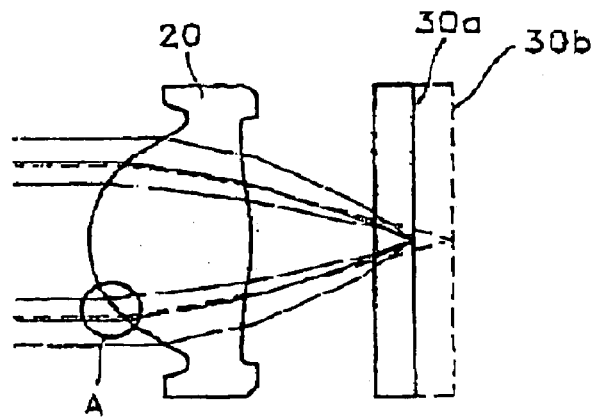
FIG. 6 is a diagram showing an optical path through the objective lens of the optical pickup device according to the present invention.
Figure 7:
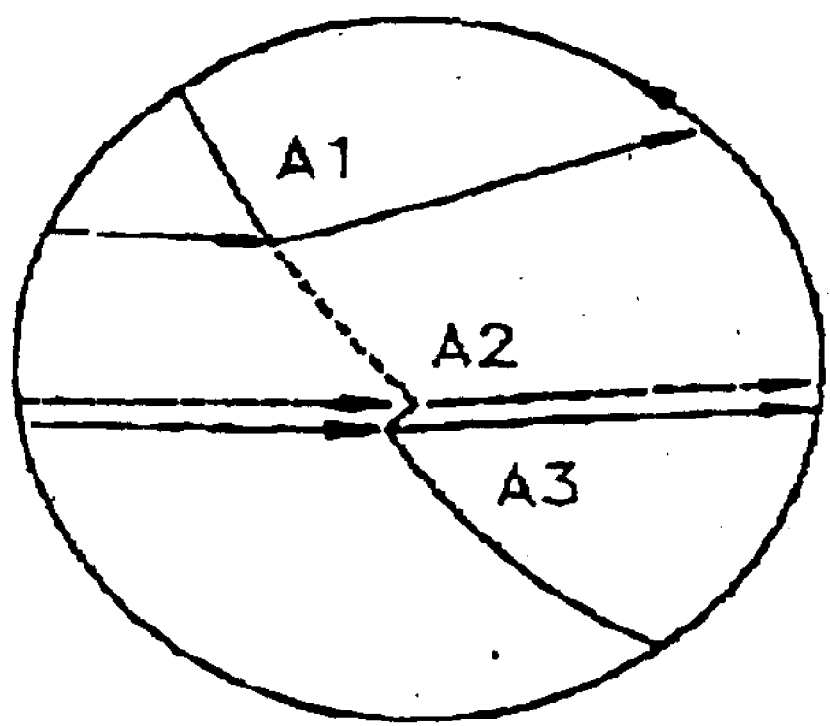
FIG. 7 is a magnified view of portion A in FIG. 6.

Thus, as shown in FIGS. 6 and 7, when information is reproduced from the thick CD 30b, only light inside the dashed line is focused on the thick CD 30b. Here, since light of the near axis area passes through the objective lens, less spherical aberration is generated, even though the curvature of the central region A1 corresponding to the near axis area is optimized for the thin DVD 30a. Also, when reproducing information from the thin DVD 30a, light passes through the central and peripheral regions A1 and A3 whose curvature is optimized for the thin DVD 30a, thereby forming a focus on a surface including information of the thin DVD 30a.

When a numerical aperture (NA) of the regions corresponding to the near and intermediate axis areas is less than 0.4, a small focus can be formed on the thick CD 30b, wherein the small focus is optimized for the CD disk. According to experimentation, it is preferable that the width of the ring-shaped intermediate region is greater than 50 µm from the thin DVD 30a for a stable reproducing characteristic. Also, the data of the objective lens 20 for each region which is optimized for the CD and DVD are summarized in Tables 1 and 2, respectively.

Table 1 shows lens data at the intermediate region A2 which is optimized for the thick CD 30b, and Table 2 shows lens data at the central and periphery regions A1 and A3 optimized for a thin DVD 30a. In these tables, the references to "front," "back," and "disk" represent the front surface of the objective lens 20, the back surface of the objective lens 20 and the surface of the disk, respectively. That is, in Table 1, the data for the curved surfaces "front," "back," and "disk" refer to the data of the front surface of the objective 20 lens at the intermediate region A2, the back surface of the lens at the intermediate region A2, and the surface of the thick CD 30b, respectively, and in Table 2, the data for the curved surfaces "front," "back," and "disk" refer to the data of the front surface of the objective lens 20 at the central and periphery regions A1 and A3, the back surface of the lens at the central and periphery regions, and the surface of the thin DVD 30a, respectively.

As described above, according to the optical pickup device of the present invention, the thick CD and the thin DVD can be compatibly adopted and a signal can be detected without picking up noise regardless of the thickness of the disk. Also, the objective lens can be manufactured easily by a general compression or injection molding, thereby reducing manufacturing costs.

TABLE 1

Data at the intermediate region of the objective lens

| Curved Surface | Curvature | Thickness | Refractive Index | Aspherical Coefficient |
|---|---|---|---|---|
| front | 2.40632 | 2.600000 | 1.505 | K = 0.00000<br>A = −3.51258E-03<br>B = −6.19938E-04<br>C = −2.32191E-04<br>D = 0.00000 |
| back | −5.11700 | 1.563295 | 1.580 | K = −24.72000<br>A = 4.46350E-03<br>B = −3.69750E-03<br>C = 8.23880E-04<br>D = −7.45950E-05 |
| disk | ∞ | 1.200000 | 1.550 | Not Applicable |

TABLE 2

Data at the central and periphery regions

| Curved Surface | Curvature | Thickness | Refractive Index | Aspherical Coefficient |
|---|---|---|---|---|
| front | 2.09200 | 2.600000 | 1.505 | K = −0.872110<br>A = 4.79500E-03<br>B = 6.25260E-05<br>C = 1.24380E-05<br>D = −1.76880E-04 |
| back | −5.11700 | 1.563295 | | K = −24.72000<br>IC: Yes<br>CUF = 0.000000<br>A = 4.46350E-03<br>B = −3.69750E-03<br>C = 8.23880E-04<br>D = −7.45950E-05 |
| disk | ∞ | 0.600000 | 1.550 | Not Applicable |

What is claimed:

1. A recording and/or reproducing apparatus compatible with disks having different thicknesses, comprising:
   an optical pickup device comprising:
      a light source to emit a light beam along a common optical axis,
      an objective lens having a surface with regions which are optimized to selectively focus the light beam on the disks having the different thicknesses depending upon the thicknesses of the disks, with at least one region having an optical property to focus the light beam received at an angle relative to the common optical axis onto one of the disks but does not focus the light beam received at the angle onto another of the disks according to the thicknesses of the disks and at least one other region surrounding the common optical axis having an optical property to focus the light beam received at the angle onto the disks independent of the thicknesses of the disks, and
      a photo detector to detect the light beam reflected from the disks having the different thicknesses; and
   a processing unit to process an information signal to control the light beam generated by the light source, and to process the detected light beam from the photo detector.

2. The recording and/or reproducing apparatus as claimed in claim 1, wherein the at least one other region of the objective lens extends from the common optical axis to the at least one region.

3. The recording and/or reproducing apparatus as claimed in claim 1, wherein the at least one other region is disposed at the common optical axis of the light beam and with the optical property to focus the light beam onto the one and another of the disks independent of the thicknesses of the disks.

4. The recording and/or reproducing apparatus as claimed in claim 1, wherein the surface having the regions comprises a continuous surface defining said objective lens.

5. The recording and/or reproducing apparatus as claimed in claim 1, wherein:
   the objective lens comprises another surface and a material, and
   the light beam passes only through the material when proceeding within the objective lens between the surface and the another surface.

6. The recording and/or reproducing apparatus as claimed in claim 1, wherein:
   the objective lens comprises another surface, and
   the objective lens does not include an air gap disposed between the surface and the another surface through which the light beam passes when traveling within the objective lens between the surface and the surface.

7. A recording and/or reproducing apparatus compatible with disks having different thicknesses, comprising:
   an objective lens to focus a light beam on the disks having the different thicknesses, wherein the objective lens has a surface having a ring region through which a portion of the light beam passes and another region surrounding a common optical axis at which the light beam is received at the surface and having an optical characteristic to focus the light beam onto the disks having different thicknesses, and the ring region has a different optical characteristic than the optical characteristic of the another region on the surface through which another portion of the light beam passes and at least one sub-region with an optical property to focus the light beam onto one of the disks but does not focus the light beam onto another of the disks according to the thicknesses of the disks; and
   a processing unit to process an information signal to control the light beam transmitted to said objective lens, and to process the light beam reflected from said one optical memory medium and transmitted through said objective lens.

8. The recording and/or reproducing apparatus as claimed in claim 7, wherein the ring region has a different optical characteristic from additional regions of the surface of the objective lens other than the ring region.

9. The recording and/or reproducing apparatus as claimed in claim 7, wherein the another region of said objective lens has at least one sub-region disposed at the common optical axis of the light beam and with an optical property to focus the light beam onto the disks independent of the thicknesses of the disks.

10. The recording and/or reproducing apparatus as claimed in claim 7, wherein the surface having the ring region and the another region comprises a continuous surface defining said objective lens.

11. The recording and/or reproducing apparatus as claimed in claim 7, wherein:
   said objective lens comprises another surface and a material, and
   the light beam passes only through the material when proceeding within said objective lens between the surface and the another surface.

12. The recording and/or reproducing apparatus as claimed in claim 7, wherein:

said objective lens comprises another surface, and said objective lens does not include an air gap disposed between the surface and the another surface through which the light beam passes when traveling within said objective lens between the surface and the another surface.

13. A recording and/or reproducing apparatus compatible with disks having different thicknesses, comprising:

an optical pickup device comprising:

a light source to emit a light beam, an objective lens to focus the light beam received at an angle relative to a common optical axis on the disks having the different thicknesses, wherein the objective lens has a surface with at least one region optimized to focus the light beam received at the angle onto the disks independent of the thicknesses of the disks and at least one other region which is optimized to selectively focus the light beam received at the angle onto one of the disks and not to focus the light beam received at the angle onto another one of the discs depending upon the thicknesses of the disks, and a photo detector to detect the light beam reflected from the disks having the different thicknesses, and a processing unit to process an information signal to control the light beam generated by the light source, and to process the detected light beam from the photo detector.

14. The recording and/or reproducing apparatus as claimed in claim 13, wherein the light beam is emitted along the common optical axis, and the one region surrounds the common optical axis to focus the light beam onto the disks independent of the thicknesses of the disks.

15. The recording and/or reproducing apparatus as claimed in claim 13, wherein:

said objective lens comprises another surface and a material having an optical characteristic, and the light beam passes only through the material when proceeding within said objective lens between the surface and the another surface.

16. The recording and/or reproducing apparatus as claimed in claim 13, wherein the at least one region which is optimized to focus the light beam onto the disks independent of the thicknesses of the disks is disposed between the common optical axis of the light beam and the one other region.

17. A recording and/or reproducing apparatus compatible with optical memory media of different thicknesses, comprising:

an objective lens having at a surface with at least one region which is optimized to focus a light beam received at an angle relative to a common optical axis onto one of the optical memory media independent of the thickness of the one optical memory medium and at least one other region which is optimized to selectively focus the light beam received at the angle onto one of the optical memory media and not to focus the light beam received at the angle onto another one of the optical memory media depending upon the thicknesses of the optical memory media; and a processing unit to process an information signal to control the light beam transmitted to said objective lens, and to process the light beam reflected from said one optical memory medium and transmitted through said objective lens.

18. The recording and/or reproducing apparatus as claimed in claim 17, wherein the one region surrounds the common optical axis along which the light beam is proceeds to the surface and focuses the light beam onto the optical memory media independent of the thicknesses of the memory media.

19. The recording and/or reproducing apparatus as claimed in claim 17, wherein:

the objective lens comprises another surface and a material having an optical characteristic, and the light beam passes only through the material when proceeding within the objective lens between the surface and the another surface.

20. The recording and/or reproducing apparatus as claimed in claim 17, wherein the at least one region which is optimized to focus light onto the one optical memory medium independent of the thickness of the one optical memory medium is disposed between a common optical axis of the light beam and the one other region.

21. A recording and/or reproducing apparatus compatible with optical memory media of different types, comprising:

an objective lens having at a surface with at least one region which is optimized to focus a light beam received at an angle relative to a common optical axis onto first and second types of the optical memory media and at least one other region which is optimized to selectively focus the light beam received at the angle onto the first type of the optical memory media and not to focus the light beam received at the angle onto the second type of the optical memory media; and a processing unit to process an information signal to control the light beam transmitted to said objective lens, and to process the light beam reflected from said one optical memory medium and transmitted through said objective lens.

* * * * *

UNITED STATES PATENT AND TRADEMARK OFFICE
CERTIFICATE OF CORRECTION

PATENT NO. : 6,882,614 B2
DATED : April 19, 2005
INVENTOR(S) : Chul-woo Lee et al.

It is certified that error appears in the above-identified patent and that said Letters Patent is hereby corrected as shown below:

<u>Title page,</u>
Item [56], References Cited, OTHER PUBLICATIONS, insert
-- Y. Komma et al., "Dual focus optical head for 0.6mm and 1.2mm disks," Optical Data Storage, SPIE vol. 2338, 1994, pp. 282-288. --.

<u>Column 6,</u>
Line 21, insert -- another -- before "surface" second occurrence.

Signed and Sealed this

Fourth Day of April, 2006

JON W. DUDAS
*Director of the United States Patent and Trademark Office*